United States Patent [19]

Kasai et al.

[11] Patent Number: 4,908,271

[45] Date of Patent: Mar. 13, 1990

[54] CAPSULE-SHAPED POLYMER PARTICLES AND PROCESS FOR THE PRODUCTION THEREOF

[75] Inventors: Kiyoshi Kasai, Yokkaichi; Masayuki Hattori, Aichi; Hiromi Takeuchi; Nobuo Sakurai, both of Yokohama, all of Japan

[73] Assignee: Japan Synthetic Rubber Co., Ltd., Tokyo, Japan

[21] Appl. No.: 212,577

[22] Filed: Jun. 28, 1988

Related U.S. Application Data

[62] Division of Ser. No. 871,416, May 23, 1986, Pat. No. 4,798,691.

[30] Foreign Application Priority Data

Oct. 3, 1984 [JP] Japan ................. 59-206172

[51] Int. Cl.$^4$ .................. B32B 25/00; B32B 27/00
[52] U.S. Cl. ................. 428/402.22; 521/64; 523/201
[58] Field of Search .......... 521/64; 523/201; 428/402.22; 424/501

[56] References Cited

U.S. PATENT DOCUMENTS

| | | | |
|---|---|---|---|
| 2,969,330 | 1/1961 | Brynko | 264/4.7 |
| 3,220,960 | 11/1965 | Wichterle et al. | 521/89 |
| 3,576,760 | 4/1971 | Gould et al. | 424/78 |
| 3,784,391 | 1/1974 | Kruse et al. | 521/64 |
| 3,847,840 | 11/1974 | Kanig | 521/64 |
| 4,064,294 | 12/1977 | Babil et al. | 521/62 |
| 4,075,134 | 2/1978 | Morehouse, Jr. et al. | 524/490 |
| 4,325,856 | 4/1982 | Ishikawa et al. | 523/201 |
| 4,611,014 | 9/1986 | Jones et al. | 521/64 |
| 4,798,691 | 1/1989 | Kasai et al. | 428/402.22 |

FOREIGN PATENT DOCUMENTS

| | | | |
|---|---|---|---|
| 54-151606 | 11/1979 | Japan | 523/201 |
| 2040863 | 9/1980 | United Kingdom | 521/65 |

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

Capsule-shaped polymer particles and a process for the production thereof are described. In one embodiment of the process, a polymerizable monomer component containing a cross-linkable monomer and a hydrophilic monomer, and an oily substance are finely dispersed in water to prepare an oil-in-water emulsion and then the polymerizable monomer component is polymerized, whereupon capsule-shaped polymer particles containing the oily substance as a core material are obtained. Upon removal of the oily substance in the particles, there are obtained capsule-shaped hollow polymer particles. These capsule-shaped polymer particles are excellent in such properties as mechanical strength and heat resistance, and thus can find many applications.

4 Claims, 2 Drawing Sheets

10 μm  (× 1500)

10 μm  (× 1500)

10 μm (×2600)

0.5 μm (×35000)

CAPSULE-SHAPED POLYMER PARTICLES AND PROCESS FOR THE PRODUCTION THEREOF

This is a division of application Ser. No. 871,416, filed May 23, 1986, now U.S. Pat. No. 4,798,691.

TECHNICAL FIELD

The present invention relates to capsule-shaped polymer particles formed by utilizing phase-separation between a polymer and an oily substance in the inside of particles during polymerization, hollow capsule-shaped polymer particles formed from such capsule-shaped polymer particles, and a process for the production thereof.

BACKGROUND ART

For capsulation by covering a core in a fine particle form with a polymer, so-called microcapsulation, a number of methods are known, including the phase-separation method, the interfacial polymerization method, the in situ polymerization method and the spray drying method.

In microcapsulation by the in situ polymerization method among the above methods, generally by carrying out polymerization in a dispersion system in which a core material and reactants, i.e., reaction components such as a monomer and a prepolymer necessary to form a polymer, or a catalyst coexist, a polymer insoluble in the core material and a dispersion medium is formed in the interface therebetween and thus a shell of the polymer is formed on the surface of particles of the core material, whereby capsulation is realized.

However, in microcapsulation by the conventional in situ polymerization method, in practice, capsulation is rarely achieved as described above; it has disadvantages in that the polymer formed by polymerization does not sufficiently undergo phase-separation from the core particle and is entrained in the core particle, thereby failing to form a shell, or even if the polymer is formed in the condition that it has undergone phase-separation from the core particle, the shell is formed insufficiently and the core in the inside is exposed, and thus capsulation is incomplete. Thus, in fact, the capsulation by the in situ polymerization method has not almost been put into industrial use although it has advantages in that the process is simple and the size of the capsule or the thickness of the shell is easy to control.

Heretofore, as methods for the production of hollow capsule-shaped polymer particles (hereinafter referred to as "hollow polymer particles"), for example, the following have been known:

(I) a method in which a foaming agent is incorporated in polymer particles and afterwards the foaming agent is expanded;

(II) a method in which a volatile substance such as butane is incorporated in a polymer and afterwards it is gassified and expanded;

(III) a method in which a polymer is melted, and gas such as air is jetted into the molten polymer to thereby incorporate air bubbles in the polymer; and (IV) a method in which an alkali swelling substance is incorporated in the inside of polymer particles, and an alkaline liquid is permeated through the polymer particles to swell the alkali swelling substance.

However, these methods are all difficult in controlling conditions and it has been difficult to produce the desired hollow polymer particles in high yield and with high reliability.

DISCLOSURE OF INVENTION

The first object of the present invention is to provide capsule-shaped polymer particles in the inside of which phase-separation between a polymer phase constituting a shell and an oily substance phase constituting a core are surely carried out and a hollow portion is surely formed, and which have excellent characteristics in mechanical strength, heat resistance and so forth, and a process of production which permits easy production of the above capsule-shaped polymer particles by a simplified process.

The above first object is attained by a process for the production of capsule-shaped polymer particles which is characterized by including a step where in an aqueous dispersion in which there is formed a dispersed phase in which a polymerizable monomer component containing a cross-linkable monomer and a hydrophilic monomer and an oily substance coexist, the above polymerizable monomer is polymerized, and capsule-shaped polymer particles produced by the above process of production.

The above first object is more surely attained by a process of production which is characterized in that in production of capsule-shaped polymer particles, in addition to a polymerizable monomer component and an oily substance, a polymer different from that resulting from polymerization of the above polymerizable monomer (hereinafter referred to as a "different polymer") is introduced in a dispersed phase in an aqueous dispersion.

By coexisting a different polymer as well as the polymerizable monomer and the oily substance in a dispersed phase in an aqueous dispersion in the production of capsule-shaped polymer particles, phase-separation between a polymer phase constituting the shell of the capsule-shaped polymer and an oily substance constituting the core is surely carried out and capsulation is attained more completely.

Furthermore, the above first object is more surely attained by a process of production which is characterized in that in the production of capsule-shaped polymer particles, in an aqueous dispersion where a different polymer is dispersed in the form of finely divided particles, a polymerizable monomer component and an oily substance are made absorbed on the finely divided particles of the different polymer and thereafter the polymerizable monomer is polymerized.

The second object of the present invention is to provide hollow polymer particles which are produced from capsule-shaped polymer particles produced by the above process of production, and a process of production which permits sure production of such hollow polymer particles by a simplified process.

The above second object is attained by a process for the production of hollow polymer particles which is characterized by including a step of removing the oily substance in the capsule-shaped polymer particles produced by the above process of production, and hollow polymer particles produced by this process of production.

BEST MODE FOR CARRYING OUT THE INVENTION

Figure 1:
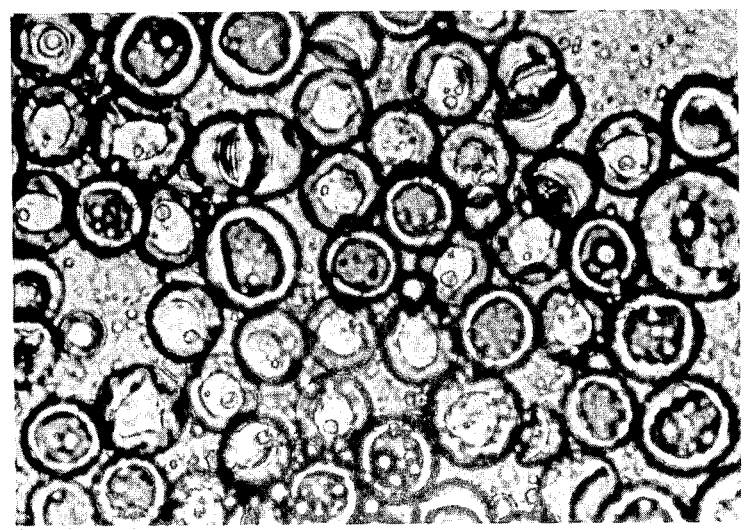
FIGS. 1 to 4 are micrographs showing the particle condition of capsule-shaped polymer particles or hollow polymer particles produced in examples of the present invention.

The polymerizable monomer component as used herein comprises (a) a cross-linkable monomer, (b) a hydrophilic monomer, and (c) other monomer which is used if desired.

As the cross-linkable monomer (a), divinyl monomers such as divinylbenzene, ethylene glycol dimethacrylate, 1,3-butylene glycol dimethacrylate, trimethylolpropane trimethacrylate, and allyl methacrylate, and trivinyl monomers can be given. Of these monomers, divinylbenzene, ethylene glycol dimethacrylate, and trimethylolpropane trimethacrylate are particularly preferred.

The amount of the cross-linkable monomer used is usually 1 to 50 parts by weight, preferably 2 to 20 parts by weight per 100 parts by weight of the total weight of the polymerizable monomer component. The amount of the cross-linkable monomer is calculated as a pure monomer excluding an inert solvent and a monocyclic non-cross-linkable monomer component usually contained in a cross-linkable monomer material. If the amount of the cross-linkable monomer used is too small, phase-separation between the polymer constituting the shell and the oily substance constituting the core is accomplished insufficiently, or a problem arises in that the strength of the shell is poor, so that the final capsule-shaped polymer particles cannot maintain its shape.

On the other hand, if the amount of the cross-linkable monomer used is too large, the polymer different from that resulting from polymerization of the polymerizable monomer component tends to be expelled to the outside of polymer particles formed during polymerization, as a result of which a problem arises in that the final polymer particles are not in a true spherical form and only block-shaped particles having irregularities in the surface thereof are obtained.

As the hydrophilic monomer (b), vinyl monomers such as vinylpyridine, glycidyl acrylate, glycidyl methacrylate, methyl acrylate, methyl methacrylate, acrylonitrile, acrylamide, methacrylamide, N-methylolacrylamide, N-methylolmethacrylamide, acrylic acid, methacrylic acid, itaconic acid, fumaric acid, vinyl acetate, dimethylaminoethyl methacrylate, diethylaminoethyl methacrylate, 2-hydroxyethyl methacrylate, and 2-hydroxypropyl methacrylate can be given. Particularly preferred are methyl methacrylate, vinylpyridine and 2-hydroxethyl methacrylate, and not more than 20 wt. % of unsaturated carboxylic acids such as methacrylic acid.

The solubility in water of the hydrophilic monomer is preferably not less than 0.5 wt. % and particularly preferably not less than 1 wt. %. Although the optimum amount of the hydrophilic monomer used varies with the type of the oily substance constituting the core, it is usually 3 to 99 parts by weight, preferably 5 to 99 parts by weight, and particularly preferably 50 to 95 parts by weight per 100 parts by weight of the total weight of the polymerizable monomer component.

When unsaturated carboxylic acid is used as the hydrophilic monomer, the amount of the unsaturated carboxylic acid used is preferably not more than 20 wt. %. When the hydrophilic monomer is vinylpyridine or 2-hydroxyethyl methacrylate, the amount of the hydrophilic monomer used is preferably not more than 40 wt. %.

If the amount of the hydrophilic monomer used is too small, a problem arises in that phase-separation between the polymer constituting the shell and the oily substance constituting the core does not occur or occurs only insufficiently and thus the polymer fails to completely cover the whole core particle, leading to unsatisfactory capsulation.

As the monomer (c) which is used if desired, any monomers can be used as long as they are radical polymerizable. Typical examples are aromatic vinyl monomers such as styrene, alpha-methylstyrene, p-methylstyrene, and halogenated styrene, vinyl esters such as vinyl propionate, ethylenically unsaturated carboxylic acid alkyl esters such as ethyl methacrylate, butyl acrylate, butyl methacrylate, 2-ethylhexyl acrylate, 2-ethylhexyl methacrylate, lauryl acrylate, and lauryl methacrylate, and conjugated diolefins such as butadiene and isoprene. Of these monomers, styrene is particularly preferred.

In the present invention, in order to more accelerate phase-separation in the inside of polymer particles during polymerization, it is particularly preferred that a polymer different from that resulting from polymerization of the polymerizable monomer component be previously added to an aqueous dispersion medium. It is necessary for this different polymer to be a polymer of type or composition different from that resulting from polymerization of the above polymerizable monomers (a) to (c), and further to be soluble in the polymerizable monomer or oily substance.

Typical examples of the polymer different from that of the polymerizable monomer component are polystyrene, carboxyl-modified polystyrene, a styrene-butadiene copolymer, a styrene-acrylate copolymer, a styrenemethacrylate copolymer, an acrylate copolymer, a methacrylate copolymer, a carboxyl-modified styreue-acrylatc copolymer, a carboxyl-modified styrene-methacrylate copolymer, a carboxyl-modified acrylate copolymer, and a carboxyl-modified methacrylate copolymer.

Of these polymers, polystyrene or a styrene copolymer containing at least 50 wt. % of a styrene component is preferred.

The amount of the polymer as defined above being used is 1 to 100 parts by weight, preferably 2 to 50 parts by weight, and more preferably 5 to 20 parts by weight per 100 parts by weight of the total weight of the polymerizable monomer component. If the amount of the polymer used is less than 1 part by weight, the effect of acceleration of phase-separation is poor. On the other hand, if the amount of the polymer used is in excess of 100 parts by weight, a problem arises in that phase-separation rather tends to be prevented.

In polymerizing the polymerizable monomer component in the presence of the polymer different from that resulting from polymerization of the polymerizable monomer component, the following methods can be employed. (1) The different polymer is used in the form of solid particles. These solid particles are dispersed in an aqueous medium and after the polymerizable monomer component and the oily substance are added to the above dispersion and absorbed in the finely divided polymer particles, the polymerizable monomer component is polymerized; (2) The polymer is dissolved in the polymerizable monomer component and/or the oily substance to prepare a solution, and after the solution is dispersed in water, the polymerizable monomer component is polymerized.

When the different polymer is used in a particle state by the method (1), the finely divided polymer particles act as seed polymer particles and the polymerizable monomer component and the oily substance are absorbed therein. Thus it is preferred for the polymer to have a high capacity to absorb the polymerizable monomer component and the oily substance. For this reason, it is preferred for the polymer to have a low molecular weight. For example, the number average molecular weight is not more than 20,000, preferably not more than 10,000, and more preferably not more than 7,000. The number average molecular weight as used herein is determined by usual procedures such as by dissolving the polymer in its good solvent and measuring the resulting solution by techniques such as gel permeation chromatography (GPC) or by the use of a molecular weight-measuring device by means of osmotic pressure or vapor pressure depression.

If the number average molecular weight of the polymer is more than 20,000, the amount of monomers not absorbed in the seed polymer particles is increased, and these monomers remaining unabsorbed are polymerized independently from the seed polymer particles, resulting in formation of a large amount of fine polymer particles not forming capsules and causing a problem that the polymerization system becomes unstable.

The polymer used as such seed polymer particles is not critical in its process of preparation. For example, the polymer can be produced by techniques such as emulsion or suspension polymerization using a relatively large amount of a chain transfer agent.

In a case that the polymer different from that resulting from polymerization of the polymerizable monomer component is used as seed polymer particles, the capacity of the polymer particles to absorb the polymerizable monomer component and the oily substance can be increased by making the polymer particles absorb a highly lipophilic substance having a solubility in water of not more than $10^{-3}$ wt. % prior to addition of the polymerizable monomer component and the oily substance.

When there is employed a means of making the highly lipophilic substance absorbed on the seed polymer particles, the number average molecular weight of the polymer may be more than 20,000.

Typical examples of the highly lipophilic substance are 1-chlorododecane, octanoyl peroxide, and 3,5,5-trimethylhexanoyl peroxide.

In making the highly lipophilic substance absorbed in the seed polymer particles, it suffices that an aqueous emulsion of the highly lipophilic substance is prepared and mixed with an aqueous emulsion of the seed polymer particles to thereby bring the substance into contact with the particles.

Capsule-shaped polymer particles and hollow polymer particles produced using seed polymer particles have a particle diameter which is nearly equal to that of the seed polymer particles which have swollen as a result of absorption of the polymerizable monomer and the oily substance. Thus the particle diameter of capsule-shaped polymer particles and hollow polymer particles being formed can be controlled by appropriately controlling the particle diameter of seed polymer particles, a ratio of the amount of the seed polymer particles to that of the polymerizable monomer component and the oily substance, and so forth.

Specifically, in the production of hollow polymer particles, to produce particles having a particle diameter of 0.3 to 0.6 μm, which are excellent in whiteness and hiding power, it is sufficient to use seed polymer particles having a particle diameter of 0.1 to 0.4 μm.

In producing capsule-shaped polymer particles or hollow polymer particles having a particle diameter as small as 1 μm or less, it is preferred to use seed polymer particles in that monomer droplets having a small particle diameter can be easily and stably formed.

When the polymer different from that resulting from polymerization of the polymerizable monomer component is used in the method (2) as described above, the molecular weight of the polymer is not critical. Preferably the number average molecular weight of the polymer is not less than 20,000.

The oily substance as used herein is not critical as long as it is of such lipophilic property that the solubility in water is not more than 0.2 wt. %. Any of vegetable oil, animal oil, mineral oil and synthetic oil can be used. Typical examples of the oily substance are lard oil, olive oil, coconut oil, castor oil, cotton seed oil, kerocene, benzene, toluene, xylene, butane, pentane, hexane, cyclohexane, carbon disulfide, and carbon tetrachloride.

In addition, high boiling oils such as eugenol, geraniol, cyclamen aldehyde, citronellal, dioctyl phthalate, and dibutyl phthalate can be used. When these high boiling oils are used, capsule-shaped polymer particles containing perfume, platicizers and the like in the inside thereof result.

The amount of the oily substance used is usually 1 to 1,000 parts by weight per 100 parts by weight of the total weight of the polymerizable monomer component, with the range of 5 to 300 parts by weight being preferred. Inert solvents ordinarily contained in a commercially available cross-linkable monomer material can be deemed as oily substances, and thus the amount of the inert solvent is added as that of the oily substance.

If the amount of the oily substance used is too small, the amount of the core is decreased and thus capsulation cannot be achieved. On the other hand, if the amount of the oily substance used is too large, the amount of the monomer component becomes insufficient, resulting in a reduction in the film thickness of the outer shell of the polymer formed. Thus the final capsule-shaped polymer particles are poor in strength and are readily collapsed.

The term "oily substance" as used herein includes, in addition to the above-described oily substances, polymerizable monomers as described above. In this case, during the polymerization process, polymerization is terminated in the condition that the polymerizable monomer remains unpolymerized in the inside of the polymer particles formed, and this residual monomer is used as a substitute for the oily substance. In this case, it is necessary that the polymerization yield be adjusted to not more than 97%, preferably not more than 95%. This can be attained by employing techniques such as a method in which a small amount of a polymerization inhibitor is added, a method in which the temperature of a reaction system is lowered at an intermediate stage of polymerization, and a method in which a polymerization terminator is added at an intermediate stage of polymerization.

Various substances which need physical protection against degradation, evaporation, pressure during handling, and so forth by means of capsulation, such as dyes, detergents, ink, perfume, adhesives, medicines, agricultural chemicals, fertilizer, fats and oils, foodstuffs, enzymes, liquid crystals, paints, rust preventives, recording materials, catalysts, chemical reactants, magnetic substances, and so on can be dissolved or dispersed in the oily substance as used herein depending on the purpose of use.

It is believed that polymerization in the process of the present invention is substantially suspension polymerization and is carried out in finely dispersed oil droplets containing the polymerizable monomer component, the oily substance, and preferably, the fine particles of the polymer different from that resulting from polymerization of the polymerizable monomer component, and that a polymer phase resulting from phase-separation is formed on the outside of an oily substance phase, thereby forming capsule-shaped polymer particles.

In polymerization of the present invention, surface active agents or suspension protective agents, organic or inorganic, which are commonly used in usual polymerization, can be used as dispersion stabilizers.

In general, when capsule-shaped polymer particles having a particle diameter as small as less than about 1 μm are intended to produce, the surface active agent is mainly used. On the other hand, when capsule-shaped polymer particles having a particle diameter of more than about 1 μm are intended to produce, the suspension protective agent is mainly used.

Typical examples of the surface active agent are anionic surface active agents such as sodium dodecylbenzenesulfonate, sodium laurylsulfate, sodium dialkylsulfosuccinate, and a naphthalenesulfonate-formalin condensate. Nonionic surface active agents such as polyoxyethylene nonylphenyl ether, polyethylene glycol monostearate, and sorbitan monostearate can be used in combination.

Typical examples of the organic suspension protective agent are hydrophilic synthetic polymeric substances such as polyvinyl alcohol, polyvinyl pyrrolidone, and polyethylene glycol, natural hydrophilic polymeric substances such as gelatine and water-soluble starch, and hydrophilic semi-synthetic polymeric substances such as carboxymethyl cellulose.

Typical examples of the inorganic suspension protective agent are the phosphates of magnesium, barium, potassium and the like, calcium carbonate, magnesium carbonate, zinc white, aluminum oxide, and aluminum hydroxide.

In the process of the present invention, as a polymerization initiator, any of oil-soluble and water-soluble polymerization initiators can be used.

However, in a case that the polymer different from that resulting from polymerization of the polymerizable monomer component is used in the form of seed polymer particles and capsule-shaped polymer particles having a particle diameter as small as less than about 1 μm are intended to produce, it is preferred to use a water-soluble polymerization initiator. Use of such water-soluble polymerization initiators enables to prevent polymerization in large-sized monomer droplets not absorbed in the seed polymer particles.

In other cases, it is preferred that the oil-soluble polymerization initiator be used to prevent the formation of unnecessary new polymer particles in addition to the desired capsule-shaped polymer particles.

Typical examples of the water-soluble polymerization initiator are persulfates, and redox initiators such as hydrogen peroxide-ferrous chloride, and cumene hydroperoxide-sodium ascorbinate.

Typical examples of the oil-soluble polymerization initiator are benzoyl peroxide, lauroyl peroxide, tert-butylperoxy-2-ethylhexanoate, and azobisisobutylonitrile.

In the process of the present invention, in many cases, a rate of polymerization is high because the amount of the cross-linkable monomer used is large. For this reason, in a case that polymerization is carried out in a large-sized polymerization reactor, if all the polymerization components are introduced in the polymerization reactor and polymerized at the same time, the temperature of the polymerization system becomes difficult to control and there is a danger of run-away of the polymerization reaction. In the process of the present invention, therefore, in order to avoid the above danger, it is preferred to employ the so-called increment polymerization method in which the monomer component is introduced, continuously or batchwise, in a polymerization reactor during the polymerization process as such or in the form of an emulsion.

It is preferred that the polymerizable monomer component, the oily substance, and the finely divided polymer particles be introduced in the polymerization reactor in such an emulsion state that they coexist in the same particle or droplet.

In a case that the oily substance constituting the core of the capsule-shaped polymer particles is a solvent or monomer of relatively high volatility, such as benzene, toluene, xylene, butane, pentane, hexane, cyclohexane, and methyl methacrylate, the oily substance can be easily replaced with water by applying pressure reduction treatment, steam stripping treatment and gas bubbling treatment, alone or in combination with each other, onto a dispersion of the capsule-shaped polymer particles and, as a result, hollow polymer particles containing water in the inside thereof can be obtained.

When the capsule-shaped polymer particles containing the oily substance or those hollow particles containing water as prepared by replacement of the oily substance with water using the above-described treatment are separated from water and dried, there can be obtained polymer particles the inside of which is empty, i.e., hollow polymer particles. With these hollow polymer particles, the inner diameter is usually ¼ to ¾ of the outer diameter.

The above hollow polymer particles are useful as plastic pigments which are excellent in such properties as luster and hiding power. The capsule-shaped polymer particles containing the oily substance in the inside thereof, or hollow polymer particles produced by introducing a useful component such as perfume, medicines, agricultural chemicals which are produced by the present invention, and an ink component in the inside of hollow polymer particles by techniques such as dipping, or dipping under pressure or reduced pressure can be used in various fields depending on the useful component contained thereof.

EXAMPLES

The present invention is described below in greater detail although it is not intended to be limited thereto.

| Monomer Component | |
|---|---|
| 4-vinylpyridine | 50 g |
| Divinylbenzene | 2 g |
| Styrene | 28 g |
| n-butyl acrylate | 20 g |
| Oily Substance | |
| Toluene | 100 g |
| Polymerization Initiator | |

| | |
|---|---|
| 3,5,5-trimethylhexanoyl peroxide (Perroyl 355 produced by Nippon Oil & Fats Co., Ltd.) | 2 g |

The above ingredients were mixed to prepare an oily solution. This solution was added to 400 g of water in which 10 g of polyvinyl alcohol (Gosenol GH 20 produced by Nippon Gosei Kagaku Co., Ltd.) had been dissolved, and the resulting mixture was stirred for 15 minutes at 5,000 r.p.m. by the use of a propeller-type stirring blade having a diameter of 5 cm to disperse the oily solution in water in such a manner that the diameter of oil droplets was 5 to 15 $\mu$m. The emulsion thus prepared was placed in a 1,000-milliliter separable flask. While stirring the emulsion in a nitrogen atmosphere at 120 r.p.m., polymerization was performed at a temperature of 70° C. for 15 hours to produce polymer particles. The polymer yield was 98%.

Optical microscopic examination confirmed that the polymer particle were spherical microcapsules comprising a core and a polymer shell covering the whole surface of the core, and having an average particle diameter of 10 $\mu$m. A microphotograph of these polymer particles is shown in FIG. 1.

Figure 2:

The flask was opened, and the dispersion of the capsule-shaped polymer particles was allowed to stand for several hours. Then the polymer particles were taken out of the flask. Optical microscopic examination confirmed that the polymer particles were hollow particles the outer walls of which were partially depressed. This microphotograph is shown in FIG. 2.

COMPARATIVE EXAMPLE 1

Polymer particles were produced in the same manner as in Example 1 except that 4-vinylpyridine (50 g) was not used and the amount of styrene used was changed from 28 g to 78 g.

Optical microscopic examination showed that no phase-separation occurred in the inside of the particles and the particles were uniform; that is, capsulation did not occur.

COMPARATIVE EXAMPLE 2

Polymer particles were produced in the same manner as in Example 1 except that divinylbenzene (2 g) was not used and the amount of styrene used was changed from 28 g to 30 g.

Optical microscopic examination showed that no phase-separation occurred in the inside of the particles and the particles were uniform; that is, capsulation did not occur.

EXAMPLE 2

Two hundred grams of octanoyl peroxide (Perroyl O produced by Nippon Oil & Fats Co., Ltd.) was added to 2,000 g of water containing 15 g of sodium laurylsulfate and then finely dispersed therein by the use of a Manton-Gaulin homogenizer "Model 15M" produced by Manton-Gaulin Co., Ltd. in such a manner that the particle diameter was 0.1 to 0.4 $\mu$m. To the emulsion thus prepared, 100 g of polystyrene particles (average particle diameter: 0.50 $\mu$m; average molecular weight: 105,000) as seed polymer particles and 900 g of water were added, and further 800 g of acetone was added. The resulting mixture was slowly stirred at a temperature of 10° C. for 20 hours to thereby make octanoyl peroxide absorbed in the polystyrene particles. Then the acetone was removed under reduced pressure to obtain a seed particle dispersion.

In a 1-liter separable flask was placed 32.2 g of the above seed particle dispersion. In addition, 400 g of water, 1.35 g of sodium laurylsulfate, and 1 g of polyoxyethylene nonylphenyl ether (Emulgen 931 produced by Kao-Atlas Co., Ltd.), and the following mixture were added.

| | |
|---|---|
| 2-hydroxyethyl methacrylate | 20 g |
| Divinylbenzene | 20 g |
| n-butyl acrylate | 10 g |
| Styrene | 50 g |
| Benzene | 100 g |

The resulting mixture was stirred at a temperature of 40° C. for 2 hours to make the above substances absorbed in the seed polymer particles. The temperature of the system was raised to 70° C., and polymerization was performed for 10 hours to produce polymer particles.

Figure 3:
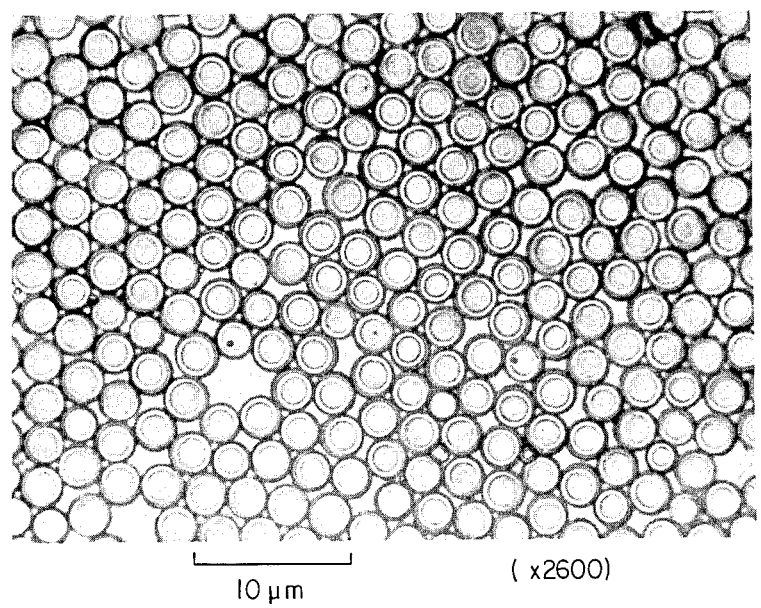

Optical microscopic examination confirmed that the polymer particles were spherical microcapsules comprising a core and a polymer shell covering the whole surface of the core. With these polymer particles, the particle diameter was uniform, the average particle diameter was 2.7 $\mu$m, and the standard deviation value of particle diameters was not more than 0.1 $\mu$m. This microphotograph is shown in FIG. 3.

On drying the polymer particles in a vacuum drier, the benzene contained in the polymer was removed, and there were obtained hollow polymer particles.

EXAMPLE 3

A latex containing styrene-butadiene copolymer particles (butadiene content: 45%) having a particle diameter of 0.25 $\mu$m and a number average molecular weight of 6,800 was produced by emulsion polymerization using a large amount of tert-dodecylmercaptan as a molecular weight modifier.

This latex was used as seed polymer particles. Four parts (2 parts as solids) of the latex, 30 parts of a 1% aqueous solution of sodium laurylsulfate, 20 parts of a 5% aqueous solution of polyvinyl alcohol, and 100 parts of water were uniformly mixed.

A mixture of the following substances:

| | |
|---|---|
| Methyl methacrylate | 80 parts |
| Divinylbenzene | 20 parts |
| Toluene | 30 parts |
| Benzoyl peroxide | 2 parts |
| 0.1% Aqueous solution of sodium laurylsulfate | 400 parts | was finely dispersed by the use of a supersonic dispersing machine and then added to the above-prepared uniform mixture. On slowly stirring the resulting mixture for 3 hours, the above monomer component and the oily substance were uniformly absorbed in seed polymer particles of the styrene-butadiene copolymer.

Upon polymerization of the mixture at 75° C. for 6 hours, polymer particles were obtained in a polymer yield of 98%.

This polymer particle dispersion was coated on a glass plate and was allowed to stand at ordinary temperature for 10 minutes. Then the water and toluene were evaporated and polymer particles were obtained. Optical microscopic examination confirmed that the polymer particles were hollow polymer particles having a high whiteness.

These hollow polymer particles were examined with a transmission-type electron microscope. This examination showed that the particles were spherical and hollow particles with no depression, having are outer diameter of 0.95 μm and an inner diameter of 0.5 μm.

EXAMPLE 4

| Divinylbenzene | 10 g |
| Styrene | 75 g |
| Benzoyl peroxide | 5 g |

The above ingredients were mixed to prepare a solution. To this solution was added 100 g of a magnetic fluid (Marpo Magna produced by Matsumoto Oil & Fats Co., Ltd.), and they were uniformly mixed. The mixture thus prepared was added to 800 g of water in which 10 g of polyvinyl alcohol (Gosenol GH 20 produced by Nippon Gosei Kagaku Co., Ltd.) had been dissolved, and then stirred at 4,000 r.p.m. by the use of a T.K. autohomomixer (produced by Tokushukika Kogyo Co., Ltd.) to thereby disperse the above mixture in water in such a manner that the average particle diameter of oil droplets was about 10 μm. Then, 15 g of 4-vinylpyridine was further added, and the resulting mixture was stirred. The emulsion thus prepared was placed in a 2-liter separable flask, and polymerization was performed in a nitrogen atmosphere at a temperature of 80° C. for 8 hours to produce polymer particles.

Optical microscopic examination confirmed that the polymer particles were spherical microcapsules comprising a core of the magnetic fluid and a shell of the polymer covering the whole surface of the core.

COMPARATIVE EXAMPLE 3

Polymer particles were produced in the same manner as in Example 4 except that 4-vinylpyridine (15 g) was not used and the amount of styrene used was changed from 75 g to 90 g.

Optical microscopic examination showed that although phase-separation locally partially occurred in the inside of the particles, capsulation was accomplished insufficiently, and part of the core material was exposed.

EXAMPLE 5

Ten parts of a commercially available polystyrene (produced by Shin-Nittetu Kagaku Co., Ltd.; number average molecular weight: 150,000) was dissolved in a mixture of 20 parts of toluene, 90 parts of methyl methacrylate, and 10 parts (calculated as pure divinylbenzene) of divinylbenzene. The solution thus prepared was added to 400 parts of water with 10 parts of polyvinyl alcohol dissolved therein, and polymerization was performed at 80° C. for 4 hours while stirring. An aqueous dispersion of polymer particles having a particle diameter of 3 to 8 μm was obtained in a polymer yield of 98%. Optical microscopic examination confirmed that the polymer particles were capsule-shaped particles having a double profile.

This aqueous dispersion of polymer particles was subjected to steam stripping treatment by blowing steam therethrough. The toluene in the inside of the polymer particles was removed, and hollow polymer particles containing water in the inside thereof was obtained.

The water-containing polymer particles and the toluene-containing polymer particles were placed on a slide glass and examined without placing a cover glass. It was observed that both the water and toluene vaporized in 1 to 2 minutes and the particles changed to hollow particles. These hollow particles were all completely spherical hollow particles with no depression, and the ratio of outer diameter to void diameter (hereinafter referred to as a "outer diameter/inner diameter ratio") was about 10:6.

EXAMPLES 6 TO 13, AND COMPARATIVE EXAMPLES 4 TO 6

Polymer particles were produced in the same manner as in Example 5 except that the amount of the polystyrene resin, the composition of the polymerizable monomer component, and the type and amount of the oily substance were changed in Table 1. They are called Examples 6-13, Comparative Examples 4-6.

These polymer particles were measured for the shape in the dispersion after polymerization, the shape after drying, and the ratio of outer diameter to void diameter (outer diameter/inner diameter ratio) in the same manner as in Example 5. The results are shown in Table 1.

TABLE 1

| Run No. | Polystyren Resin (parts) | Monomer Composition (parts) | Oily Substance | | Particle Shape after Polymerization | After Drying | |
|---|---|---|---|---|---|---|---|
| | | | Type | Amount (parts) | | Particle Shape | Inner Diameter/ Outer Diameter (μm/μm) |
| Ex. 5 | 10 | MMA/DVB = 90/10 | toluene | 20 | A | B | 1.7 |
| Ex. 6 | 10 | MMA/DVB = 55/45 | toluene | 20 | A | B | 1.7 |
| Ex. 7 | 10 | MMA/ST/DVB = 60/39/1 | toluene | 20 | A | B | 1.8 |
| Ex. 8 | 2 | MMA/ST/DVB = 60/30/10 | toluene | 20 | A | B | 1.8 |
| Ex. 9 | 70 | MMA/ST/DVB = 60/30/10 | toluene | 100 | A | B | 1.3 |
| Ex. 10 | 10 | MMA/DVB = 90/10 | toluene | 300 | A | B | 1.1 |
| Ex. 11 | 10 | MMA/ST/DVB = 10/80/10 | toluene | 20 | A | B | 1.7 |
| Ex. 12 | 10 | MA/ST/DVB = 3/87/10 | toluene | 20 | A | B | 1.7 |
| Ex. 13 | 10 | MMA/DVB = 90/10 | eugenol | 30 | A | A | 1.6 |
| Com. Ex. 4 | 10 | MMA/ST/DVB = 60/40/0 | toluene | 20 | D | D | — |
| Com. Ex. 5 | 10 | MMA/DVB = 40/60 | toluene | 20 | E | E | — |

TABLE 1-continued

| Run No. | Polystyren Resin (parts) | Monomer Composition (parts) | Oily Substance Type | Oily Substance Amount (parts) | Particle Shape after Polymerization | After Drying Particle Shape | After Drying Inner Diameter/ Outer Diameter (μm/μm) |
|---|---|---|---|---|---|---|---|
| Ex. 6 | 10 | MMA/ST/DVB = 0/90/10 | toluene | 20 | F | F | — |

MMA: Methyl methacrylate
DVB: Divinylbenzene
ST: Styrene
MA: Methacrylic acid
A: Oil-containing capsule-shaped particle
B: Hollow particle
D: Solid particle
E: Cocoon-shaped particle
F: Porous particle

EXAMPLE 14

A mixture of 98 parts of styrene, 2 parts of methacrylic acid, and 10 parts of tert-dodecylmercaptan was added to an aqueous solution prepared by dissolving 0.5 part of sodium laurylsulfate and 1.0 part of potassium persulfate in 200 parts of water, and polymerization was performed at 70° C. for 8 hours while stirring to produce polymer particles. These polymer particles had a particle diameter of 0.22 μm, a toluene-insoluble content of 3%, a number average molecular weight as determined by GPC of 4,100, and a weight average molecular weight (Mw)/number average molecular weight (Mn) ratio Mw/Mn=2.4.

These polymer particles were used as seed polymer particles. A mixture of 10 parts as solids of the polymer particles, 0.1 part of polyoxyethylene nonylphenyl ether, 0.3 part of sodium laurylsulfate, and 0.5 part of potassium persulfate was dissolved in 900 parts of water, and then a mixture of 80 parts of methyl methacrylate, 10 parts (calculated as pure divinylbenzene) of divinylbenzene, 10 parts of styrene, and 20 parts of toluene was added thereto. On stirring the resulting mixture at 30° C. for 1 hour, the above substances were almost completely absorbed in the seed polymer particles.

They were polymerized as such at 70° C. for 5 hours. A dispersion of capsule-shaped particles containing toluene in the inside thereof was obtained at a polymer yield of 98%. After application of steam stripping treatment onto the dispersion, the polymer particles were examined with a transmission-type electron microscope. It was found that the polymer particles were seen through in the central part thereof and completely spherical capsule-shaped particles. These capsule-shaped polymer particles had an outer diameter of 0.51 μm and an inner diameter of 0.3 μm.

Figure 4:
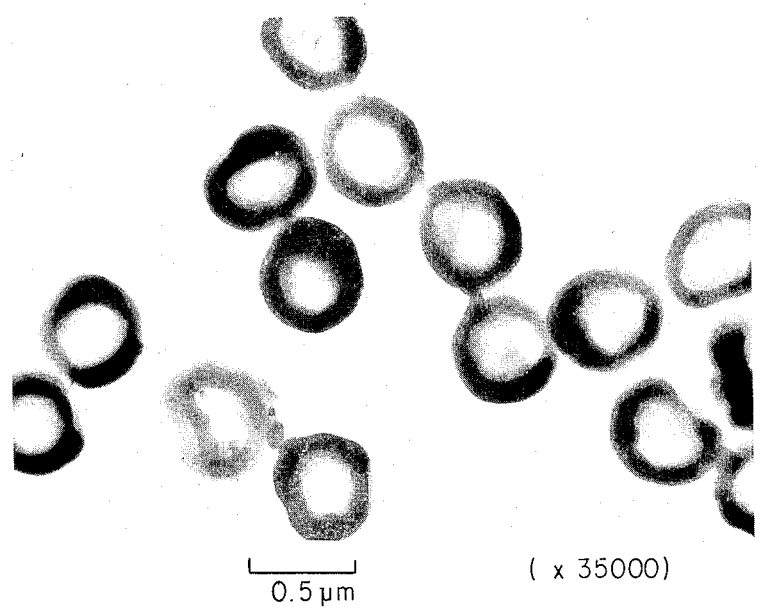

An electron microscopic photography of the particles is shown in FIG. 4.

EXAMPLES 15 TO 18

Polymer particles were produced in the same manner as in Example 14 except that as seed polymer particles, polymers having the monomer composition, particle diameter, number average molecular weight, weight average molecular weight (Mw)/number average molecular weight (Mn) ratio, and toluene-insoluble content shown in Table 2 were used.

They are called Examples 15–18.

In Example 18, since the number average molecular weight of the polymer constituting the seed polymer particles was as large as 23,000, the capacity of the polymer to absorb the monomer component and the oily substance was small and thus, in addition to the desired capsule-shaped particles, a large amount of fine particles having a particle diameter of about 0.05 μm, as formed by polymerization of oil droplets of monomers remaining unabsorbed was present and further the polymerization system was instable.

EXAMPLES 19 AND 20, AND COMPARATIVE EXAMPLES 7 AND 8

Polymer particles were produced in the same manner as in Example 14 except that as seed polymer particles, polymers having the monomer composition, particle diameter, number average molecular weight, weight average molecular weight/number average molecular (Mw/Mn) ratio, toluene-insoluble content, and amount shown in Table 2 were used.

They are called Examples 19 and 20 and Comparative Examples 7 and 8.

In Example 20, the polymer particles were hollow particles having a slightly deformed shape.

In Comparative Example 7, since the amount of the seed polymer particles used was decreased to 0.5 part, a number of monomers remained unabsorbed in the seed polymer particles. Thus a large amount of fine particles formed by polymerization of the unabsorbed monomers are present and the system was geled.

In Comparative Example 8, since the amount of the seed polymer particles used was as large as 150 parts, the amount of the seed polymer particles was too large in relation to that of the polymerizable monomer and phase-separation did not proceed well in the inside of the particles during the polymerization process. Thus the particles were not hollow particles but porous particles.

TABLE 2

| | Seed Polymer Particle Monomer Composition (parts) | Seed Polymer Particle Particle Size (μm) | Seed Polymer Particle Number Average Molecular Weight | Seed Polymer Particle Mw/Mn | Seed Polymer Particle Toluene insoluble Content (%) | Amount of Seed Particle (parts) | Hollow Particle Outer Diameter/Inner (μm/μm) |
|---|---|---|---|---|---|---|---|
| Ex. 15 | ST/MA = 98/2 | 0.22 | 4,100 | 2.4 | 3 | 10 | 0.51/0.3 |

TABLE 2-continued

| | Seed Polymer Particle | | | | | |
|---|---|---|---|---|---|---|
| | Monomer Composition (parts) | Particle Size (μm) | Number Average Molecular Weight | Mw/Mn | Toluene insoluble Content (%) | Amount of Seed Particle (parts) | Hollow Particle Outer Diameter/Inner (μm/μm) |
| Ex. 16 | ST/MA = 98/2 | 0.20 | 9,200 | 2.6 | 5 | 10 | 0.47/0.3 |
| Ex. 17 | ST/MA = 98/2 | 0.24 | 15,000 | 3.1 | 17 | 10 | 0.52/0.3 |
| Ex. 18 | ST/MA = 98/2 | 0.19 | 23,000 | 3.2 | 30 | 10 | 0.35/0.3 |
| Ex. 19 | polystyrene | 0.12 | 2,600 | 2.2 | 0 | 2 | 0.40/0.2 |
| Com. Ex. 7 | polystyrene | 0.12 | 2,600 | 2.2 | 0 | 0.5 | gelation |
| Ex. 20 | ST/MMA/BD = 60/30/10 | 0.35 | 7,200 | 3.2 | 22 | 50 | 0.52/0.3 |
| Com. Ex. 8 | ST/MMA/BD = 60/30/10 | 0.35 | 7,200 | 3.2 | 22 | 150 | 0.45 μm (porous particles) |

ST: Styrene
MA: Methacrylic acid
BD: Butadiene
MMA: Methyl methacrylate

EXAMPLES 21 TO 31, AND COMPARATIVE EXAMPLES 9 TO 11

Polymer particles were produced in the same manner as in Example 14 except that as seed polymer particles, 10 parts of the same particles as used in Example 14 were used, and as the monomer and the oily substance, those shown in Table 3 were used.

They are called Examples 21–31, Comparative Examples 9–11.

In Examples 14, 21 and 22, and Comparative Examples 9 and 10, the amount of the cross-linkable monomer used was changed.

In Examples 23 to 26 and Comparative Example 11, the amount and type of the hydrophilic monomer were changed.

In Examples 27 to 29, the amount of toluene used was changed.

In Example 29, the shell of the hollow polymber particles was thin and they were in an easily breakable condition.

In Example 30, geraniol as perfume was used as the oily substance. In this example, capsule-shaped polymer particles containing perfume were obtained.

In Example 31, dibutyl phthalate was used as the oily substance. In this example, capsule-shaped particles containing dibutyl phthalate were obtained.

TABLE 3

| | Monomer Composition (parts) | Oily Substance | | Particle Shape after Polymerization | After Drying | |
|---|---|---|---|---|---|---|
| | | Type | Amount (parts) | | Particle | Diameter Ratio (μm/μm) |
| Ex. 14 | MMA/ST/DVB = 80/10/10 | toluene | 20 | A | B | 0.51/0.3 |
| Ex. 21 | MMA/ST/DVB = 80/19/1 | toluene | 20 | A | B | 0.50/0.3 |
| Ex. 22 | MMA/ST/DVB = 25/35/50 | toluene | 20 | A | B | 0.50/0.3 |
| Com. Ex. 9 | MMA/ST/DVB = 40/0/60 | toluene | 20 | E | E | 0.52/— |
| Com. Ex. 10 | MMA/ST/DVB = 80/20/0 | toluene | 20 | D | D | 0.50/— |
| Ex. 23 | MMA/ST/DVB = 40/50/10 | toluene | 20 | A | B | 0.48/0.3 |
| Ex. 24 | MMA/ST/DVB = 20/70/10 | toluene | 20 | A | B (slightly deformed) | 0.52/0.3 |
| Com. Ex. 11 | MMA/ST/DVB = 0/90/10 | toluene | 20 | F | F | 0.53/- |
| Ex. 25 | MA/ST/DVB = 5/85/10 | toluene | 20 | A | B | 0.49/0.3 |
| Ex. 26 | HEM/ST/DVB = 40/40/20 | toluene | 20 | A | B | 0.51/0.3 |
| Ex. 27 | MMA/ST/DVB = 60/20/20 | toluene | 100 | A | B | 0.59/0.5 |
| Ex. 28 | MMA/ST/DVB = 60/20/20 | toluene | 300 | A | B | 0.68/0.6 |
| Ex. 29 | MMA/ST/DVB = 60/20/20 | toluene | 600 | A | B | 0.85/0.8 |
| Ex. 30 | MMA/ST/DVB = 80/10/10 | geraniol | 20 | A | A | 0.50/0.3 |
| Ex. 31 | MMA/ST/DVB = 80/10/10 | dibutyl phthalate | 20 | A | A | 0.50/0.3 |

MMA: Methyl methacrylate
ST: Styrene
DUB: Divinylbenzene
MA: Methacrylic acid
HEM: 2-hydroxyethyl methacrylate
A, B, D, E, F: Same as defined in Table 1

EXAMPLES 32 TO 39

Polymer particles were produced in the same manner as in Example 14 except that as seed polymer particles, 10 parts of the same particles as used in Example 14 were used, and as the monomer and the oily substance, those shown in Table 4 were used.

They are called Examples 32–39.

TABLE 4

| | Monomer Composition (parts) | Oily Substance Type | Oily Substance Amount (parts) | Particle Shape after Polymerization | After Drying Particle | After Drying Diameter Ratio (μm/μm) |
|---|---|---|---|---|---|---|
| Ex. 32 | MMA/ST/DVB = 80/10/10 | benzene | 20 | A | B | 0.50/0.3 |
| Ex. 33 | MMA/ST/DVB = 80/10/10 | p-xylene | 20 | A | B | 0.48/0.3 |
| Ex. 34 | MMA/ST/DVB = 80/10/10 | cyclo-hexane | 20 | A | B | 0.53/0.3 |
| Ex. 35 | AA/ST/TMP = 5/85/10 | n-hexane | 20 | A | B | 0.51/0.3 |
| Ex. 36 | MMA/ST/EGD = 80/10/10 | p-xylene | 20 | A | B | 0.47/0.3 |
| Ex. 37 | VP/ST/DVB = 40/50/10 | toluene | 20 | A | B | 0.52/0.3 |
| Ex. 38 | DAE/ST/DVB = 80/10/10 | toluene | 20 | A | B | 0.53/0.3 |
| Ex. 39 | GM/ST/DVB = 80/10/10 | toluene | 20 | A | B | 0.50/0.3 |

MMA: Methyl methacrylate
ST: Styrene
DVB: Divinylbenzene
AA: Acrylic acid
TMP: Trimethylpropane trimethacrylate
EGD: Ethylene glycol dimethacrylate
VP: Vinylpyridine
DAE: Dimethylaminoethyl methacrylate
GM: Glycidyl methacrylate
A, B: Same as identified in Table 1

EXAMPLES 40 AND 41, AND COMPARATIVE EXAMPLE 12

Polymer particles were produced in the same manner as in Example 14 except that toluene as the oily substance was not used, the polymerization time was adjusted to 3 hours, 4 hours or 5 hours, and the polymer yield was controlled to 90%, 96% or 100%.

They are called Examples 40, 41 and Comparative Example 12.

These polymer particles were dried and examined with a transmission-type electron microscope. In Example 40, the polymer particles were completely spherical hollow particles having an outer diameter of 0.46 μm and an inner diameter of 0.2 μm. In Example 41, the polymer particles were completely spherical hollow particles having an outer diameter of 0.48 μm and an inner diameter of 0.2 μm. However, in Comparative Example 12, the polymer particles were solid particles having a particle diameter of 0.45 μm and no void was found in the inside of the particles.

EXAMPLE 42

Twenty parts (calculated as solids) of an aqueous dispersion of polystyrene particles (particle diameter: 2 to 6 μm; average number molecular weight: 6,200) produced by suspension polymerization, 3 parts of polyvinyl alcohol and 0.5 part of sodium laurylsulfate were added to 500 parts of water, and further a mixture of 45 parts of methyl methacrylate, 5 parts of divinylbenzene, 50 parts of styrene, 3 parts of benzoyl peroxide, and 30 parts of cyclohexane was added. The resulting mixture was stirred for 3 hours to make the monomer component and the oily substance almost absorbed in the polystyrene particles. The temperature of the system was raised to 80° C., and polymerization was performed for 6 hours. Then capsule-shaped polymer particles were obtained in a polymer yield of 98%.

These capsule-shaped polymer particles were filtered off and then dried under reduced pressure to obtain hollow polymer particles having a particle diameter of 3 to 15 μm. With these polymer particles, the outer diameter/inner diameter ratio was nearly 10/6.

EXAMPLE 43

Five parts of a styrene-butadiene rubber (SBR #1500 produced by Japan Synthetic Rubber Co., Ltd.) was dissolved in a mixture of 60 parts of methyl methacrylate, 35 parts of styrene, 5 parts of divinylbenzene and 2 parts of benzoyl peroxide.

The solution thus prepared was added to 1,000 parts of water with 10 parts of polyvinyl alcohol dissolved therein and stirred, and then polymerization was performed at 60° C. for 3 hours. When the polymer yield reached 83%, the reaction system was quickly cooled to 20° C. As a result, a dispersion of capsule-shaped particles containing methyl methacrylate in the inside thereof and having a particle diameter of 5 to 10 μm were obtained in a polymer yield of 86%.

These polymer particles were subjected to steam stripping treatment and then dried to obtain hollow particles having an outer diameter/inner diameter ratio=10/6.

EXAMPLE 44

As seed polymer particles, an emulsion of polymer particles having a monomer composition of styrene/methyl methacrylate/acrylic acid=20/78/2, a number average molecular weight of 3,800, and a particle diameter of 0.16 μm was used. Five parts (calculated as solids) of the emulsion was dispersed in 200 parts of an aqueous solution in which 0.7 part of polyoxyethylene nonylphenyl ether, 0.3 part of sodium dodecylbenzenesulfonate, and 0.5 part of potassium persulfate had been dissolved.

As the monomer component, 20 parts of tetramethylolmethane triacrylate (NK Ester TMM-50T produced by Shin Nakamura Kagaku Kogyo Co., Ltd.; effective component: 50%; the remainder: toluene), 30 parts of vinylpyridine, and 60 parts of styrene were added. As the oily substance, toluene as a diluent used in NK Ester was used, and any additional oily substance was not used. The mixture was stirred at 40° C. for 30 minutes to make the oily substance and the monomer component absorbed in the polymer particles. Then the temperature was raised to 70° C., and polymerization was performed for 6 hours. Thus an emulsion of polymer particles was obtained in a polymer yield of 98%.

To this emulsion was added 20 parts of a 1% aqueous solution of calcium chloride to coaggrerate the particles. These particles were separated by filtration. On removing the water and toluene from the particles by drying in an infrared heating furnace maintained at 90 to 140° C., hollow polymer particles having an outer diameter of 0.42 μm and an inner diameter of 0.15 μm were obtained.

EXAMPLE 45

To a mixture of 25 parts (10 parts as solids) of the same seed polymer particle dispersion as used in Example 14, 1 part of sodium dodecylbenzenesulfonate 2 parts of polyethylene glycol monostearate, and 100 parts of water were added the following compounds:

| | |
|---|---|
| Methyl methacrylate | 70 parts |
| Styrene | 10 parts |
| Divinylbenzene | 20 parts |
| Toluene | 20 parts |
| Tert-butylperoxy 2-ethylhexanoate | 2 parts |

The resulting mixture was stirred to make the above compounds absorbed in the seed polymer particles.

Ten liters of the above mixture and 10 liters of water were placed in a 120-liter polymerization reactor equipped with a stirrer and a cooling device. The temperature of the system was raised to 75° C. to initiate polymerization. After one hour, polymerization was performed while introducing a fresh mixture at a rate of 10 liters per hour over 9 hours. After 12 hours, polymerization was completed to yield a dispersion of polymer particles. During the polymerization process, the temperature in the polymerization reactor could be maintained at 75° C. in a stabilized manner. The polymer yield was 99%.

Then the dispersion was subjected to steam stripping treatment. There were obtained capsule-shaped polymer particles having an outer diameter of 0.51 μm and an inner diameter of 0.2 μm.

INDUSTRIAL APPLICABILITY

In accordance with the present invention, capsule-shaped polymer particles in the inside of which phase-separation between a polymer phase constituting the shell and an oily substance phase constituting the core is surely carried out, and a process for the production of capsule-shaped polymer particles whereby the above capsule-shaped polymer particles can be easily produced by a simplified process can be provided.

Furthermore, in the present invention, by using polymer particles having a small particle diameter as the different polymer to be incorporated in the dispersion during polymerization, small-sized capsule-shaped polymer particles which have heretofore been difficult to produce can be easily produced.

In the process of the present invention, capsulation is accomplished satisfactorily. Moreover, capsule-shaped polymer particles produced by the process of the present invention are excellent in such properties as mechanical strength and heat resistance. These capsule-shaped polymer particles can contain various substances such as solvents, plasticizers, perfume, ink and oil-soluble medicines in the inside thereof as the core and, therefore, can be utilized in various fields.

Furthermore the present invention can provide water containing hollow polymer particles or hollow polymer particles by removing the oily substance contained in capsule-shaped polymer particles produced by the above process of production, and a process of production whereby the water containing hollow polymer particles or hollow polymer particles can be surely produced by a simplified process.

These hollow polymer particles possess unique optical characteristics, and high hiding power, high whiteness and excellent luster. Thus they can be used as fillers of light weight, high absorbing capacity and high oil-absorbing capacity in various fields such as agents to be compounded to paints and paper-coating compositions, water-absorbing fillers for ink jet paper, and internal fillers for paper-making.

In the above Examples and Comparative Examples, all parts and % are by weight.

We claim:

1. A capsule-shaped polymer particle having a shell portion and a core portion, said shell portion comprising a copolymer prepared by radical copolymerization of vinyl monomers, said copolymer comprising 1–50 wt. % of a cross-linkable monomer, 3–99 wt. % of a hydrophilic monomer, and 0–85 wt. % of at least one monomer copolymerizable with said cross-linkable monomer of hydrophilic monomer, said core portion comprising an oily substance, water or mixtures thereof, and said polymer particle having an outer diameter of 0.2–0.6 micron and an inner diameter of ¼ to ¾ of the outer diameter.

2. The capsule-shaped polymer particle of claim 1, wherein said copolymer comprises 2–20 wt. % of said cross-linkable monomer, 50–95 wt. % of said hydrophillic monomer and 0–48 wt. % of said copolymerizable monomer.

3. The capsule-shaped polymer particle of claim 1, wherein said cross-linkable monomer is divinylbenzene, said hydrophilic monomer is at least one monomer selected from the group consisting of methyl methacrylate, vinylpyridine, 2-hydroxy-ethyl methacrylate, and not more than 20 wt. % of an unsaturated carboxylic acid, and wherein said copolymerizable monomer is styrene.

4. The capsule-shaped polymer particle of claim 1, wherein the core portion comprises an oily substance having a solubility in water not more than 0.2 wt. %.

* * * * *